United States Patent Office 3,125,552
Patented Mar. 17, 1964

3,125,552
EPOXIDIZED POLYAMIDES
Samuel Loshaek, Hatboro, and Elizabeth A. Blommers, Abington, Pa., assignors to The Borden Company, New York, N.Y., a corporation of New Jersey
No Drawing. Filed Sept. 21, 1960, Ser. No. 57,400
10 Claims. (Cl. 260—78)

This invention relates to an epoxidized polyamide of an unsaturated polycarboxylic acid.

The invention is particularly useful in making a paper of high wet strength and will be illustrated by description in connection with such use.

Our invention provides a resin suitable for use as the binder in the wet strength paper and having the additional feature of being copolymerizable through an ethenoid bond with ethenoid comonomers so as to give additional complexing or cross-linking within the cured resin.

The invention comprises the produce resulting from and the process of forming an amide of an alkylene polyamide with an aliphatic acid having a carbon to carbon double bond, i.e., an ethenoid group in its structure, and then reacting the amide with epichlorohydrin or the like under conditions to introduce an epoxy group

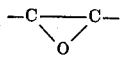

In one embodiment, the epoxidized polyamide is then reacted with an ethenoid comonomer to give polymerization through the ethenoid bond of the unsaturated acid. In a modification, the invention comprises the substitution of the aliphatic acid by the combination of a phthalic acid and methanol. The process of the invention includes treating the epoxidized polyamide with a reducing agent to reduce the intensity of color of the product and to stabilize the color so as to decrease the color change on aging.

The invention comprises also paper containing, as binder therein, a small proportion of the epoxidized polyamide resin or a polymer thereof with an ethenoid monomer.

In the use, for instance of our epoxidized polyamide of the unsaturated acid in a representative paper, we have increased the wet strength to more than 4 times the wet strength for comparable paper made without our amide, the amide when used having been applied in an aqueous solution of concentration only 0.5%.

MATERIALS AND PROPORTIONS

The acid used is an unsaturated di- or other polycarboxylic acid having at least one ethenoid bond. It is polymerizable with an ethenoid comonomer, to give an interpolymer. Such polymerizations are facilitated when the acid is alpha-unsaturated, that is, includes a double bond on a carbon atom attached to the carbon of the carboxy group, COOH. When the amide is eventually to be homopolymerized, the unsaturated acid chosen is itaconic acid. Examples that illustrate the class of acids that we use are the $C_4$–$C_{10}$ ethenoid acids such as itaconic, fumaric, maleic, citraconic, and mesaconic acids. In addition to the aliphatic unsaturated acids, we may use mononuclear aromatic hydrocarbon polycarboxylic acids as, for example, terephthalic or isophthalic, trimesic, or diphenic acid in the amount of 5–70 moles for 100 total moles of the mixed unsaturated and aromatic acids. For some uses of the wet strength resin, we may use the aromatic as the only unsaturated acid, particularly in combination with methanol.

The polyamine which is reacted with the ethenoid aliphatic acid, to make the amide, is any one of the common aliphatic polyamines, having at least 2 primary amine groups and at least 1 secondary amine group. Examples of amines that illustrate the class that we can use are diethylenetriamine, triethylenetetramine, tetraethylenepentamine, and the homologous amines in which the ethylene group is replaced by propylene, butylene, or any $C_3$–$C_4$ alkylene group.

As the halohydrin we use ordinarily epichlorohydrin. It is effective and available at a satisfactory price. We may use any other water soluble or otherwise water dispersible chlorohydrin having in its structure the epoxy group. We may also use the corresponding bromo- and iodohydrins although there is no advantage now known in their use which offsets the disadvantage of their additional cost.

When the comonomer is used to introduce the additional complexing or cross-linking referred to above, the comonomer is an ethenoid compound. This means that it is copolymerizable with other ethenoid monomers. Examples that illustrate the class are vinyl acetate, $C_1$–$C_4$ alkyl esters of acrylic and methacrylic acids, $C_1$–$C_4$ alkyl vinyl ethers such as any one of the series methyl vinyl ether $CH_2=CH-O-CH_3$ up to butyl vinyl ether, styrene and mixtures or copolymers of any of the said comonomers.

All reactions described herein, except the heating to form the amide, are suitably made in solution or emulsion. Suitable solvents include water, any $C_1$–$C_4$ saturated alcohol, dioxane and glycol monoethylether, the choice of solvent depending on the particular application of the resulting polymer.

When the water is used as the sole solvent or emulsification medium for the amide, it is advantageous to admix an organic solvent for the epoxidation step, e.g., any one of those shown, the lower alcohols such as methanol and ethanol giving a special benefit when the acid used is aromatic.

Examples of the initiators that we may use to polymerize the epoxidized polyamides are hydrogen peroxide, potassium persulfate, sodium perborate, tertiary-butyl hydroperoxide, azobisisobutyronitrile, and the combination of any one or more of them with each other or with a reducing agent in the so called redox system of initiators. Suitable reducing agents to be used in the redox system are ascorbic acid, sodium metabisulfite, and a ferrous salt such as ferrous chloride or sulfate, as in equal amounts by weight of the oxidizing and the reducing agent. These agents are all water soluble and are adapted for emulsion polymerization of the ethenoid materials.

Also there may be used a cationic or nonionic emulsifying agent, as for example, benzyl trimethyl ammonium chloride, polyvinyl alcohol, methyl cellulose, and glycerine, pentaerythritol, and diethylene glycol monoesters of lauric, palmitic, oleic, and stearic acids.

The following table shows proportions of the several components in our synthesis that (1) are operative or permissible and (2) those that are recommended for commercial use, for 1 mole of the unsaturated acid used in making the amide.

| Reactant | For 1 Mole of the Unsaturated Acid Used | |
|---|---|---|
| | Permissible | Recommended |
| Alkylene polyamine, moles | 0.9–1.6 | 1–1.3 |
| Halohydrin, moles | 0.4–3.5 | 1–3 |
| Comonomer, moles | 0–20 | 0.05–15 |
| Reducing agent, g. per g. mole of the acid | 0–5 | 0.2–2 |

The permissible proportions of the reducing agent, when used is ordinarily about 0.2–2 parts by weight for 100 parts by weight of the unsaturated acid used in making the amide, the weight of the reducing agent being somewhat higher within the range for those agents which, for a given weight, have relatively low reducing capacity.

The initiator, when used, is in conventional proportion, e.g., 0.1%–2% of the total weight of monomers.

The acid is used in proportion to react, i.e., form an amine salt, with at least 2 primary groups of the polyamine used but to leave unreacted at this stage at least 1 secondary amine group.

PROCESS OF SYNTHESIS

The reactions involved in forming a representative epoxidized polyamide may be illustrated as follows, the intermediate or monomeric amide step being omitted:

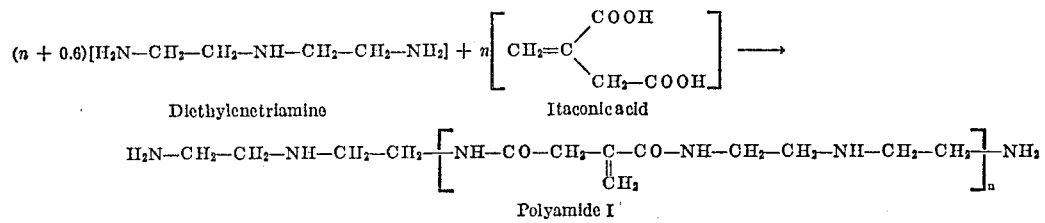

The by-product is water.

The reaction of the polyamide I with epichlorohydrin is represented below:

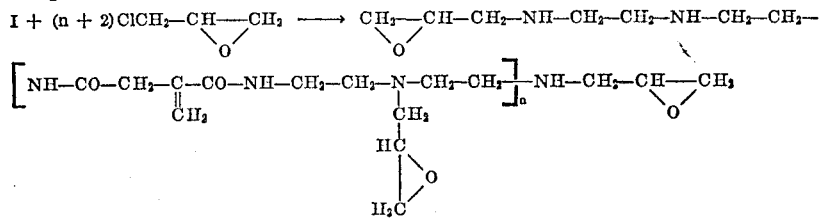

Here the epichlorohydrin has been used in amount to react with less than all of the secondary amine groups —NH— and also with any primary amine remaining in I. The chlorine in the chlorohydrin used, forms hydrochloride (not shown) with amine groups.

The epoxy groups, supplied by the epichlorohydrin used, are attached in part at least to the nitrogens of the original secondary amine groups in the polyamine used.

In the conversion of the amine salt to the amide, the salt is heated to expel the last of the water which was used initially as solvent, as well as the water formed by the decomposition of the amine salt into the amide.

In the amide so formed there will remain some unreacted amine moiety including the secondary amine groups, when we use the polyamine in proportion to provide sufficient primary amine groups to react with all of the carboxylic acid groups of the selected acid or acids. We find it desirable in fact to use an excess of the primary amine groups above this theoretical quantity, to ensure complete utilization of the said acids.

In the next step, the polyamide is epoxidized with the halohydrin of which epichlorohydrin is an example. We mix the selected halohydrin with the polyamide, the mixture ordinarily being made slowly so as to avoid overheating due to the exothermic reaction that occurs. We add the epichlorohydrin with stirring and, if necessary, also with cooling to moderate the reaction. To complete the reaction finally, we prefer to supply heat at the end so as to raise the temperature to within the range about 60°–100° C. We discontinue the heating when the rate of increase of viscosity becomes slow, e.g., until the viscosity on the Gardner-Holdt scale at 23° C. becomes B or higher and in commercial operations B or higher but short of the stage of gelation, either in the heated condition or upon standing cold. As another criterion, we continue the heating ordinarily until the rate of fall of the pH of the whole solution becomes slow and usually until the pH falls below 6, as it will as the amine alkalinity reacts with the hydrochloric acid from the chlorohydrin.

The product at a pH of 6 or below is then ready for shipment and use. It may be further diluted by additional water to the low concentration which is satisfactory in the treatment of paper stock or further acidified, as by hydrochloric acid, to a pH of about 4–4.5.

When it is desired to improve the color of the finished product, we decolorize either the polymeric amide or the epoxidized amide.

Thus we may first give the itaconic or other unsaturated acid to be used a water wash, in which case the water is discarded. Then we maintain the itaconic acid or other unsaturated acid if colored, in aqueous solution and before its reaction, in good contact with decolorizing carbon, an example being Nuchar, e.g., 5% of the Nuchar on the weight of the acid suitably at an elevated temperature such as 60°–100° C., for an hour or so and then filter the resulting suspension. The filtrate so lightened in color is then used to supply the acid for reaction with the amine. In an alternative form of this treatment, we percolate the colored itaconic or other unsaturated acid solution slowly through a bed of decolorizing charcoal in granular form.

Other decolorizing treatments that we have used to advantage include mixing the decolorizing carbon for a few hours with the aqueous solution of the mixed reactants or of the finished polyamide, either before or after the treatment with the epichlorohydrin followed by filtration and acceptance of the filtrate so decolorized for use or the subsequent processing described.

Also we may and suitably do decolorize our finished resin solution with a reducing agent such as sodium sulfoxylate formaldehyde (Formopon), sulfur dioxide, or sodium bisulfite, metabisulfite, or hydrosulfite, by dissolving the agent in the solution to be decolorized, as in the proportion of about 0.5%–10% of the weight of the polymer in solution.

The resinous epoxyamides so made are water dispersible. When in anhydrous form, they set to a gel at room temperatures and to a hard resin at elevated temperatures such as 60°–120° C. The said amides are cationic. They can be polymerized with other ethenoid monomers by being heated with a usual initiator of ethenoid bond polymerization. They may be homopolymerized in like manner through the ethenoid bonds of the unsaturated acids, except when the acid used is fumaric or maleic.

INTERPOLYMERIZATION

To make the interpolymer, the epoxidized amide made as described above is mixed with vinyl acetate or any of the other ethenoid comonomers listed herein.

The proportions may be varied within wide limits, as, for instance, 1–99 parts of either our epoxypolyamide or of the said comonomer for 100 parts total weight of the two. Actually we prefer (1) to modify our polyamide resin by copolymerizing it with about 1–20 parts of the said comonomer to 100 total weight of the said resin and comonomer or (2) to mix the comonomer with about 1–20 parts of our epoxidized polyamide resin monomer for 100 parts of the finished copolymer. In other words, we may use about 1–20 parts of either of these materials for 100 parts total weight of the two monomers.

In making such copolymers, we first emulsify the aqueous solution of the epoxidized polyamide made as stated with the vinyl acetate or other selected comonomer and with an initiator of ethenoid polymerization. Alternatively, we omit the water and use a solution in one of the organic solvents shown.

The invention will be further illustrated by description in connection with the following specific examples or the practice of it. In these examples and elsewhere herein proportions are expressed as parts by weight except when specifically stated to the contrary.

Example 1

Diethylenetriamine 112 parts (1.09 moles) and water 100 parts were placed in a vessel equipped with a mechanical agitator and condenser. Into this solution was introduced itaconic acid 129 parts (0.99 mole). This corresponds to 1.10 moles of the diethylenetriamine for 1 mole of the acid. After the acid had dissolved in the amine solution, the resulting mixture was heated gradually up to the temperature of 100°–110° C. and water was boiled off.

The heating was continued until the temperature rose to 160°–165° C. The temperature was maintained for 3 hours, i.e., until the amine salt, which had been formed in the initial reaction, was decomposed to the amide which still retains the secondary amine group —NH— in unreacted condition. The product so made was then cooled to about 140° C. and dissolved in 200 parts of water. The viscosity, as measured at a temperature of 23° C. in a solution of solids content about 50%, was then F on the Gardner scale.

The aqueous solution of the polyamide so made was heated to 50° C. and there was then added epichlorohydrin in the proportion of 0.9 mole for 1 mole of the itaconic acid represented in the same solution, i.e., for 1 equivalent of secondary amine in the diethylene triamine used. Thus we added slowly over a period of 15 minutes 17 parts of epichlorohydrin to 211.7 parts of the foregoing polyamide solution which had been further diluted in advance to a polyamide content of about 18.7% (39.4 parts dry weight), so as to moderate the reaction.

The mixture was then heated to 80°–85° C. until the resulting mixture had obtained a Gardner viscosity greater than E, that is, until the reaction of the chlorohydrin on the polyamide was substantially complete and the pH had fallen to below 6 and had become substantially constant. Then we introduced 150 parts more of water, cooled the whole to room temperature and added about 2 parts of 6 N hydrochloric acid, in order to adjust the pH to 4.6.

The resulting acidified final solution contained about 13% of total solids and at that concentration had a Gardner viscosity of B as measured at 23° F. It was decolorized by the decolorizing carbon and then by the reducing agent (here sodium hydrosulfite) treatments described.

Example 2

The final solution of the epoxidized polyamide of Example 1 was mixed with acetone, in amount to precipitate the polymeric amide. This polymer was then dissolved in 20 times its weight of methanol. Twenty parts of the 5% methanol solution of the polymer was next diluted with 40 parts of methanol and the whole warmed to 40° C. Two-tenths parts of azobisisobutyronitrile was added and 20 parts of uninhibited vinyl acetate was slowly run into the methanol solution kept at 40° C. The mixture was then heated at 50°–52° C. for 3 hours. The resulting methanol solution of the copolymer formed an emulsion when mixed with water.

Paper treated with this emulsion developed wet strength faster than paper treated with an epoxidized polyamide alone.

Example 3

The composition and procedure of Example 1 are used except that the itaconic acid there used is replaced, in turn, by an equimolecular proportion of each of the other ethenoid aliphatic polycarboxylic acids listed herein.

Example 4

The composition and procedure of Example 2 are used except that the vinyl acetate is replaced by an equimolecular proportion of any of the other ethenoid comonomers disclosed herein for reaction with the epoxidized polymeric amide.

Example 5

The procedure and composition of Example 1 are used except that the final water solution of the epoxidized polyamide is mixed with hydrochloric acid solution to lower the pH to 3.4 and then with 1% of the resin (dry weight) of azobisisobutyronitrile initiator and the resulting solution is then heated at 60°–66° C. for two hours to homopolymerize the said amide. The so-treated polyamide was found to develop wet strength more rapidly than the same polyamide solution heated with no initiator present.

Example 6

The procedure and composition of Example 1 are used except that 15% of the itaconic acid there used was replaced by an equimolar proportion of isophthalic acid.

In a modification of this example, the proportion of the itaconic acid replaced by the isophthalic acid was 50% and the reaction temperature for amide formation, by heating the amine and acid mixture, was raised finally to 200°–210° C.

In another modification, 15% of the itaconic acid was replaced, in turn, by an equivalent weight of any of the other aromatic acids shown herein as alternatives for the isophthalic acid.

Such replacement of a part of the itaconic acid by isophthalic acid or like aromatic acid lightens the color of the product. The product, however, retains the property of being complexed through the ethenoid bond in the unsaturated acid component.

Example 7

The procedure and composition of Example 1 were used except that the itaconic acid as first introduced was mixed with fumaric or with maleic acid in the proportion of 0.5 mole of the itaconic acid to 0.5 mole of fumaric acid in one case and 0.5 mole of maleic in the other preparation.

It is understood that the maleic or other acid herein referred to may be supplied to the reaction in the form of the anhydride, when commercially available, and that the anhydride in contact with the water gives the acid.

The products made as described herein and particularly in the examples are useful as the binder in paper to which they impart a high and satisfactory wet strength.

Example 8

A wood pulp filter paper (Whatman No. 1) was dipped for 2 seconds in a 0.5% solution of the polyamide made from itaconic acid and diethylene triamine and then epoxidized with epichlorohydrin, all as described in Example 1. The impregnated paper was then soaked in distilled water for 5 minutes to remove water soluble materials from the said solution that had not been associated by the substantive action or held otherwise on the fibers. The thus treated paper was dried and warmed for 1 hour at 105° C. and then again immersed in and subsequently withdrawn from water. The strength of this paper, when tested in wet strips 1 inch wide, was found to be 2 lbs. as compared with only 0.44 lb. for the same paper without the added epoxidized amide.

In a modification of this preparation, the epoxidized polyamide solution was adjusted to pH 8 by the addition of a small amount of sodium hydroxide before the drying and warming. The wet strength of the paper with the alkalized binder was then 2.7 pounds per inch.

*Example 9*

The epoxidized polyamide of itaconic acid and diethylenetriamine made as described in Example 1 is introduced in aqueous solution into the wood pulp in a commercial paper beater, in amount to give a resin cured on paper that corresponds to about 1% of the dry weight of the pulp, the beating completed, the stock so produced formed into paper on a Fourdrinier paper making machine, and the resulting paper dried, in conventional equipment and manner. The paper so made meets the requirements for commercial papers of high wet strength.

*Example 10*

The procedure and composition of Example 1 were used except that (1) the itaconic acid was replaced entirely by 166.1 parts (1 mole) of isophthalic acid, (2) diethylene triamine was replaced entirely by an equivalent weight of tetraethylene pentamine, (3) the amide formation was carried out at 205°–210° C., and (4) methanol, in the amount of 100% of the dry weight of the polyamide, was mixed with the aqueous solution of the polyamide before the 3 moles of epichlorohydrin were added.

The methanol, by what we consider to be actual chemical combination with the product such as formation of an ether with the epoxide groups, prevents separation of the epoxidized amine. Thus the substitution of inert dioxane for methanol requires a much larger amount of this solvent to keep the resin in solution as well as forming a dried cured film which is cloudy.

The solution of the epoxidized polyamide made with the isophthalic acid is used as the paper binder without first removing the excess of methanol.

The methanol required may be greatly reduced from 100%, e.g., to 10% of the polyamide and as low as 2%–5% if a larger excess of the amine to isophthalic acid is used, such as 1.2 moles for 1 mole of the acid.

In a modification of this example, the isophthalic acid is replaced by an equal weight of terephthalic acid, or in turn by an equivalent weight of each of the other aromatic acids disclosed herein.

In a further modification of this example, the methanol is replaced by an equivalent weight of ethanol.

It is to be understood that it is intended to cover all changes and modifications of the examples of the invention herein chosen for the purpose of illustration which do not constitute departures from the spirit and scope of the invention.

We claim:

1. In making a water soluble ethenoid bond polymerizable monomer containing terminal amide groups and a glycidyl ether group attached to and pendant from a secondary amine group, the process which comprises forming a mixture of (1) 1 mole of of an alkylene polyamine, having 2–4 carbon atoms per alkylene unit, two terminal primary amine groups and at least one intermediate secondary amine group, and (2) 0.9–1.6 moles of an alpha-unsaturated $C_4$–$C_{10}$ aliphatic polycarboxylic acid, the proportion of said acid being so selected within the range stated as to provide the acid in amount less than equivalent to all amine groups and leave at least one secondary amine group, heating the resulting primary amine salt having therein unreacted secondary amine group at a temperature above the boiling point of water until said salt is decomposed to amide group and no substantial amount of additional water is liberated, then admixing epichlorohydrin in the proportion of about 0.4–3 moles for each mole of said acid used, and warming the resulting mixture at a temperature of at least 50° C. until the reaction that ensues between the unreacted secondary amine group and the epichlorohydrin is substantially completed and the pH has fallen to a substantially constant level.

2. The process of claim 1 which includes dissolving in water the amide formed by said heating of said salt before admixing the epichlorohydrin.

3. The process of claim 2, the said alkylene polyamine being diethylenetriamine.

4. The process of claim 2, said acid being selected from the group consisting of itaconic, citraconic, mesaconic, fumaric and maleic acids.

5. The process of claim 3, said acid being itaconic in the proportion of about 1 mole for 1.1 moles of the diethylene triamine.

6. The process of claim 2 which includes admixing a water soluble initiator of ethenoid bond polymerization into the product of the reaction of the secondary amine group and the epichlorohydrin and then warming the resulting solution until polymerization of said product to a resin occurs.

7. The process of claim 2, said polycarboxylic aliphatic acid being mixed with a mononuclear aromatic hydrocarbon polycarboxylic acid, in the proportion of 5–70 moles of the aromatic acid for 100 moles of the aliphatic acid, before said heating above the boiling of water.

8. The resinous water soluble epoxidized polyamide product of the process of claim 2, said acid being selected from the group consisting of itaconic, citraconic, mesaconic, fumaric and maleic acids.

9. The resinous soluble epoxidized polyamide product of the process of claim 8, said acid being mixed with a mononuclear aromatic hydrocarbon polycarboxylic acid in the proportion of 5–70 moles of the aromatic acid for 100 moles of the aliphatic acid.

10. The copolymer of the epoxidized amide of claim 8 with an ethenoid comonomer selected from the group consisting of vinyl acetate, $C_1$–$C_4$ alkyl esters of acrylic and methacrylic acids, $C_1$–$C_4$ alkyl vinyl ethers, styrene and mixtures thereof, the proportion of the comonomer being 0.05–15 moles for 1 mole of said alpha-unsaturated acid.

References Cited in the file of this patent

UNITED STATES PATENTS

| | | |
|---|---|---|
| 2,149,273 | Carothers | Mar. 7, 1939 |
| 2,483,513 | Allen et al. | Oct. 4, 1949 |
| 2,632,748 | Caldwell | Mar. 24, 1953 |
| 2,641,593 | Teeter et al. | June 9, 1953 |
| 2,893,974 | Greenlee | July 7, 1959 |
| 2,926,154 | Keim | Feb. 23, 1960 |
| 2,961,347 | Floyd | Nov. 22, 1960 |
| 2,970,971 | Katz et al. | Feb. 7, 1961 |

FOREIGN PATENTS

| | | |
|---|---|---|
| 786,116 | Great Britain | Nov. 13, 1957 |